O. B. HITCHCOCK & A. M. & F. M. BERGGREN.
AUTOMOBILE TRANSMISSION MECHANISM.
APPLICATION FILED DEC. 27, 1910.
1,025,804.
Patented May 7, 1912.
2 SHEETS—SHEET 1.
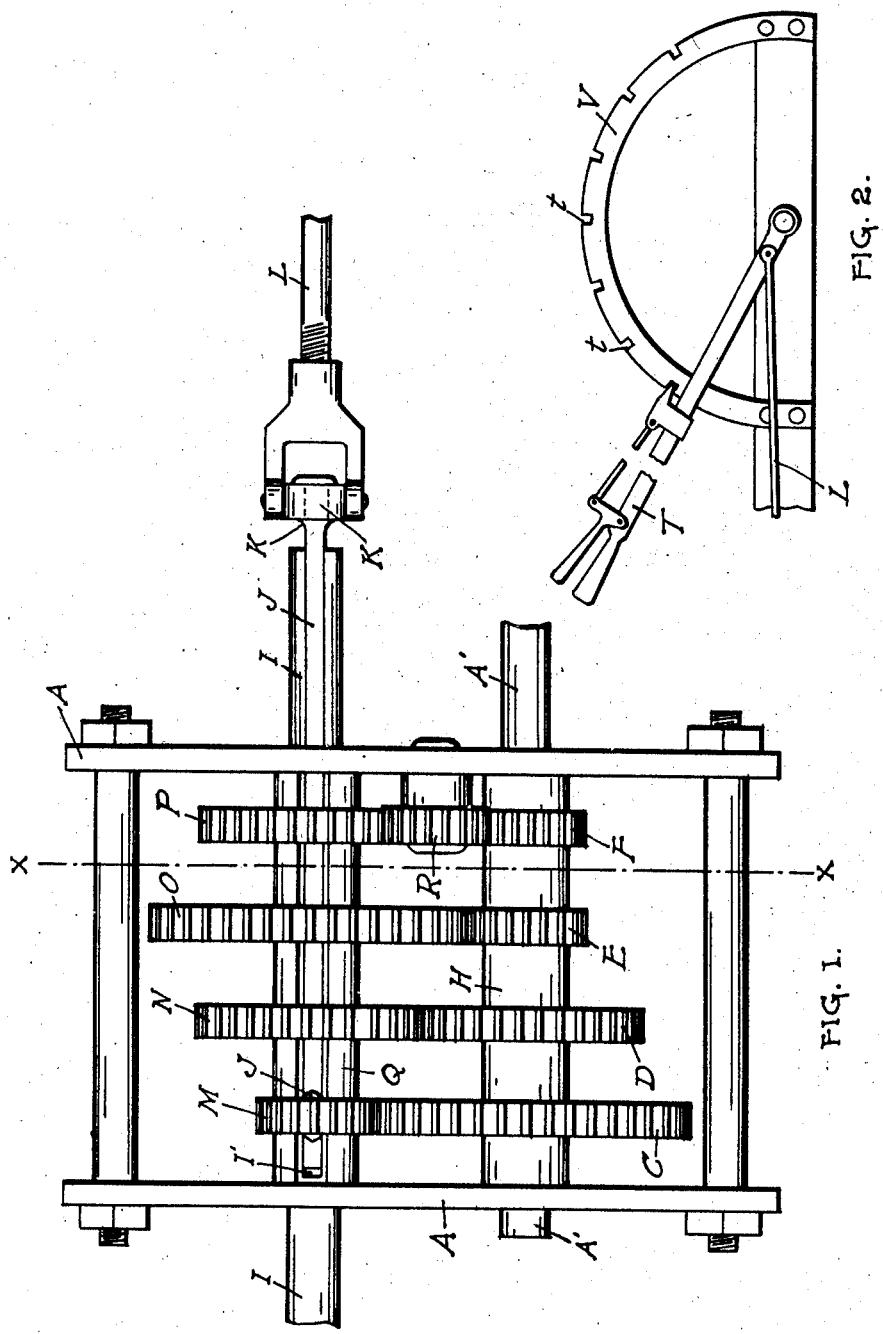
WITNESSES:
A. B. Cornelius
Evangeline O. Gibbons
INVENTORS:
Orion B. Hitchcock,
Arthur M. Berggren,
Fred M. Berggren
By Eugene Ayres,
Attorney O. B. HITCHCOCK & A. M. & F. M. BERGGREN.
AUTOMOBILE TRANSMISSION MECHANISM.
APPLICATION FILED DEC. 27, 1910.
1,025,804.
Patented May 7, 1912.
2 SHEETS—SHEET 2.
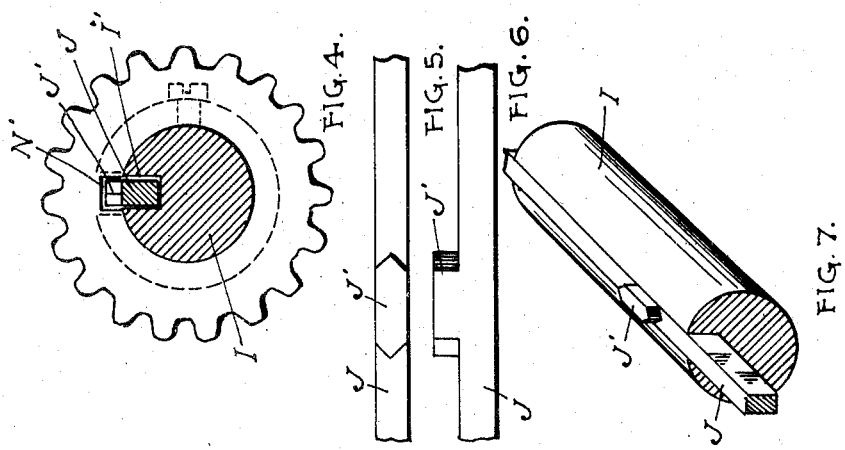
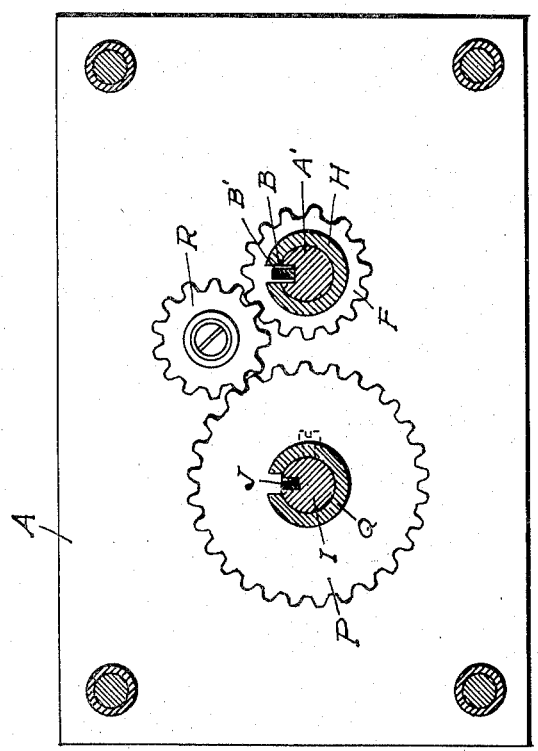
WITNESSES:
INVENTORS:

UNITED STATES PATENT OFFICE.

ORION B. HITCHCOCK, ARTHUR M. BERGGREN, AND FRED M. BERGGREN, OF MORGANVILLE, KANSAS.

AUTOMOBILE TRANSMISSION MECHANISM.

1,025,804. Specification of Letters Patent. Patented May 7, 1912.

Application filed December 27, 1910. Serial No. 599,351.

*To all whom it may concern:*

Be it known that we, ORION B. HITCHCOCK, ARTHUR M. BERGGREN, and FRED M. BERGGREN, citizens of the United States, residing at Morganville, in the county of Clay and State of Kansas, have invented certain new and useful Improvements in an Automobile Transmission Mechanism, of which the following is a specification.

The object of our device is to provide a mechanism especially adapted for use with automobiles by which all gear or cog stripping are eliminated and by which the jar on the transmission mechanism is obviated.

We accomplish our object by the mechanism illustrated in the accompanying drawings, in which,—

Figure 1 is a top view of the device showing the gearing as set on high speed; Fig. 2 is a side elevation of a ratchet lever and a connecting rod; Fig. 3 is a cross sectional view of the device cut on line $x$—$x$, as shown in Fig. 1; Fig. 4 is an enlarged sectional view of a transmission shaft and a sliding key engaged with a gear wheel; Fig. 5 is a top view of the sliding key, broken away, showing a lug thereon; Fig. 6 is a side view of the sliding key and lug shown in Fig. 5, and Fig. 7 is a perspective view of the transmission shaft, the sliding key shown seated in the groove thereof and the lug on the key.

Similar letters refer to similar parts in the several views.

In said views A represents a frame and A′ a drive shaft supported thereby. One end of this shaft is adapted to be fastened to an automobile engine by an ordinary clutch. A key seat B is grooved in said shaft to permit a key B′ to be driven solidly therein. Four gear wheels, C, a large wheel, D, a smaller wheel, E, a small wheel, and F, a second small wheel, are carried on said shaft. A stationary collar H is also carried on said shaft between each of said gear wheels to assist in holding said wheels properly spaced apart.

I is a transmission shaft adapted to be attached with a chain or bevel gear to a bevel gear on the drive shaft of an automobile. Said shaft I is also provided with a groove I′ to admit a sliding key J; this key is provided with a lug J′ near its inner end; the outer end of said key is provided with an elbow K to center with the shaft as the key turns. Said elbow has a loose, preferably forked, coupling K′. Said shaft I has four gear wheels: a small gear wheel M to mesh with the opposite large gear wheel C on drive shaft A for high speed; a larger gear wheel N to mesh with the opposite gear wheel D of the same size for medium speed; a large gear wheel O to mesh with the opposite small gear wheel E for slow speed. A second larger gear wheel P and the opposite small gear wheel F mesh with a reverse gear wheel R which is attached to frame S, as shown in Fig. 3. Gear wheels M, N, O and P are loose on the transmission shaft. Each of said wheels has a cut out opening N′ next the transmission shaft slightly larger than and conformed to the shape of lug J′ to permit said lug to be slid back and forth with its key and to engage with said wheels in regulating speed. Each of said wheels is loose on the shaft so that the key can slide back and forth through the gears. Said shaft also has a collar Q between each gear open on one side to permit said lug J′ to pass back and forth with the sliding key. These collars may be held rigid on the shaft by set screws. Said collars are the same width as those on shaft A and are about a half inch wider than the gear wheels in order that the lug on the sliding key, when in the key seats between the gears, will be free from the gears. The lug should be about one fourth of an inch longer than the gear wheels' width.

From the foregoing description it should be understood that whenever the lug is between the gear wheels the device will be out of gear and that the gear wheels on shaft I are at all times in mesh with the gear wheels on drive shaft A.

T is a lever to engage with notches $t$ $t$— in circular frame V.

L is a rod forming connection between elbow K and coupling K′, and the lever T, to operate sliding key J in the transmission shaft.

It should be noticed that in our transmission mechanism the slidable key which fits in the transmission shaft groove is so arranged that the full key is in the shaft at all times, there is no spring or clutch connected therewith; it operates without the slightest rocking motion, is not forced into washers to spread them and friction is reduced to a minimum.

What we claim and desire to secure by Letters Patent, is,—

1. The combination in a transmission mechanism of gear wheels having recesses and suitable operating means, a shaft having a groove therethrough of corresponding size throughout, a slidable key fitted into and filling said groove the entire length thereof removable from either end of the same and having a lug on the top edge thereof, collars on said shaft between said gear wheels divided at said groove to permit said lug to travel through said recesses.

2. In an automobile transmission mechanism the combination of a supporting frame, a drive shaft provided with a groove therethrough extending from end to end, a plurality of collars divided at said groove, a large gear wheel, a smaller gear wheel, two corresponding small gear wheels and a key driven solidly in said groove said division of collars forming a space, a transmission shaft, a groove therethrough of equal size from end to end of the shaft, a small gear wheel thereon engaging with said large gear wheel, a gear wheel of corresponding size with the smaller gear wheel on the drive shaft, a large gear wheel engaging with one of the small gear wheels on said drive shaft, a small gear wheel on said transmission shaft all of the wheels on said transmission shaft having corresponding recesses, a reverse gear always in mesh with said smaller gear wheel on the transmission shaft and with the opposite small gear wheel on the drive shaft, collars between the gear wheels on the transmission shaft open over said groove, a solid elongated slidable key fitted to said groove having a lug on its top edge adapted to engage with the transmission shaft gears and suitable operating mechanism having connection with said elongated key.

In testimony whereof we affix our signatures in presence of two witnesses.

ORION B. HITCHCOCK.
ARTHUR M. BERGGREN.
FRED M. BERGGREN.

Witnesses:
J. S. ALVIN CARLSON,
S. D. SCHOOLEY.